(12) United States Patent
Hirata

(10) Patent No.: US 8,915,279 B2
(45) Date of Patent: Dec. 23, 2014

(54) ROTARY LAMINATION APPARATUS

(75) Inventor: Kazuyuki Hirata, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 384 days.

(21) Appl. No.: 13/412,894

(22) Filed: Mar. 6, 2012

(65) Prior Publication Data

US 2012/0241095 A1    Sep. 27, 2012

(30) Foreign Application Priority Data

Mar. 24, 2011   (JP) .................... 2011-066386

(51) Int. Cl.
*B29C 65/06*   (2006.01)
*H02K 15/02*   (2006.01)
*B21D 28/22*   (2006.01)

(52) U.S. Cl.
CPC ........... *H02K 15/02* (2013.01); *B21D 28/22* (2013.01)
USPC ........... 156/360; 156/367; 156/368; 156/378; 156/379; 156/510

(58) Field of Classification Search
CPC ........ B32B 41/00; B32B 38/04; B29C 65/06; B29C 60/0609; B29C 65/0618; H02K 115/02; B21D 28/22
USPC .............. 156/360, 367, 368, 378, 379, 510; 29/34 R, 598, 609, 738
See application file for complete search history.

(56) References Cited

U.S. PATENT DOCUMENTS

| 4,845,832 A * | 7/1989 | Martin et al. ............... 29/564.2 |
| 6,328,136 B1 | 12/2001 | Tauchi et al. |
| 2010/0056030 A1 | 3/2010 | Tomita |

FOREIGN PATENT DOCUMENTS

| JP | 59-07435 | 1/1984 |
| JP | 61-12519 | 1/1986 |
| JP | 06-143174 | 5/1994 |
| JP | 2003-019520 | 1/2003 |
| JP | 2010-52112 | 3/2010 |
| WO | 98/41467 | 9/1998 |

OTHER PUBLICATIONS

Japan Office action, mail date is Jul. 22, 2014.

* cited by examiner

*Primary Examiner* — George Koch
(74) *Attorney, Agent, or Firm* — Greenblum & Bernstein, P.L.C.

(57) ABSTRACT

A rotary lamination apparatus includes a die, a punch, a rotation drive source, a mounting table, at least one proximity sensor, and a determining device. The punch punches core pieces from a thin plate material. The rotation drive source drives and rotates the die about the central axis of the die. The mounting table is arranged in the inner space formed by the die. The core pieces are rotated and laminated on the mounting table. The proximity sensor detects whether the die is in the proximity of a predetermined position in a non-contact manner after the die has stopped rotating. The determining device determines whether the die is stopped at the predetermined position based on a detection result from the proximity sensor.

5 Claims, 7 Drawing Sheets

ROTARY LAMINATION APPARATUS

BACKGROUND OF THE INVENTION

The present invention relates to an apparatus for manufacturing a core for a rotational electric machine such as a stator core or a rotor core for a motor. Specifically, the invention relates to a rotary lamination apparatus for rotating and laminating core pieces punched from a thin plate.

Figure 6:
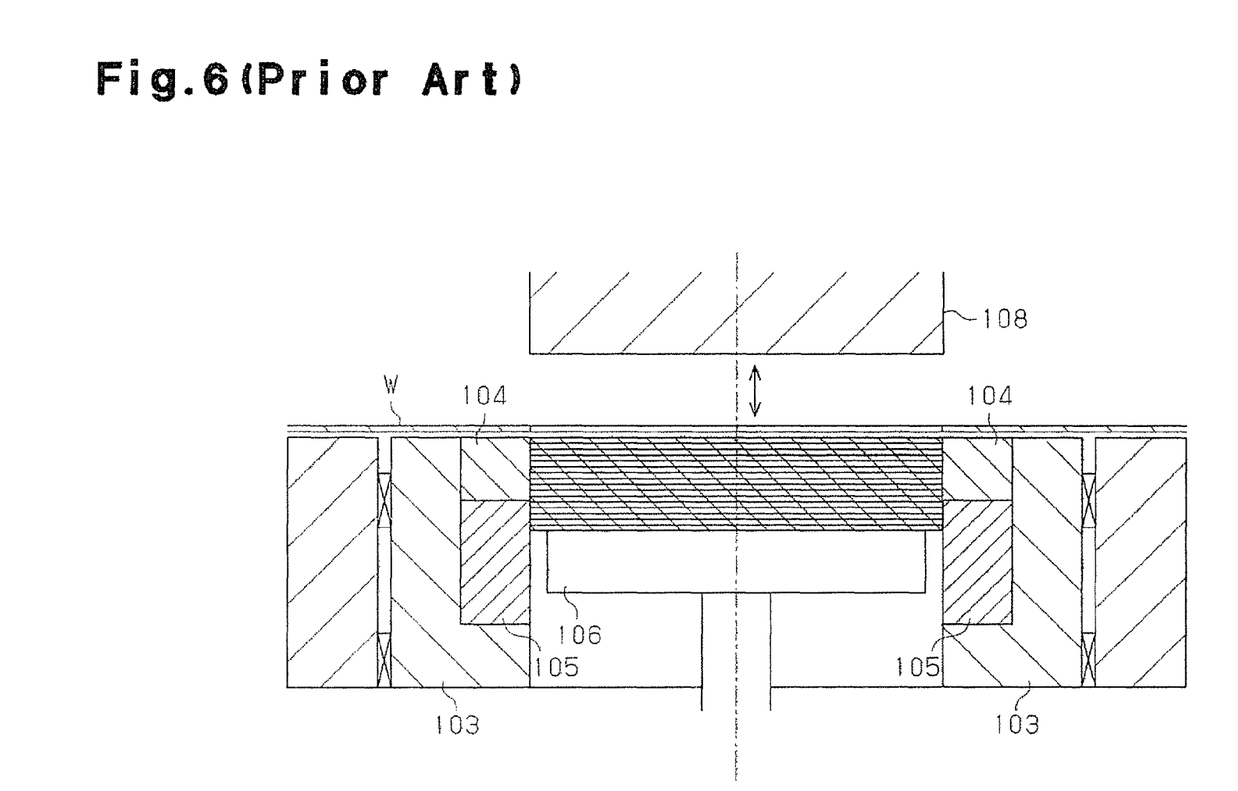
FIG. 6 is a longitudinal cross-sectional view showing a conventional rotary lamination apparatus.

This type of rotary lamination apparatus is described in, for example, Japanese Laid-Open Patent Publication No. 2003-19520. FIG. 6 shows a typical configuration of conventional rotary lamination apparatuses, including the apparatus described in this publication.

In this rotary lamination apparatus, a thin plate material W is mounted on a die 104. A punch 108 is then lowered into the inner space formed by the die 104 to punch a core piece Wa from the thin plate material W. Punched core pieces Wa are pressed and held by a pressing ring 105 from the outer circumference and mounted on a mounting table 106. Each time a single core piece or a predetermined number of core pieces Wa are punched, a holding member 103 and the die 104 are each rotated by a predetermined angle. Thus, the punched core pieces Wa are rotated relative to cores WA, which have been already laminated, and mounted on the cores WA. In this manner, rotary lamination is carried out.

Figure 7:
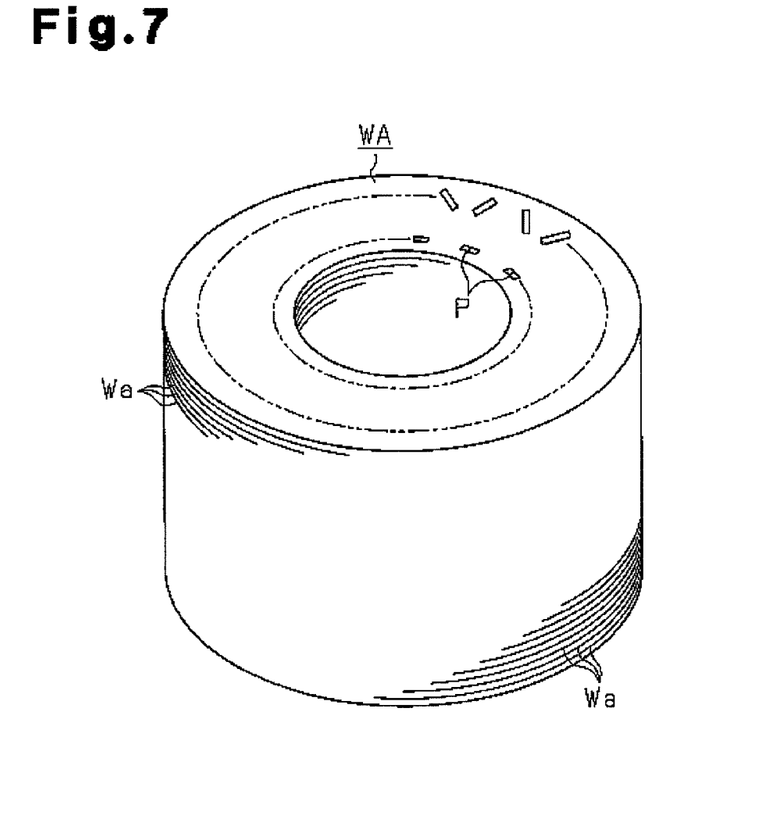
FIG. 7 is a perspective view showing a core.
Figure 8:
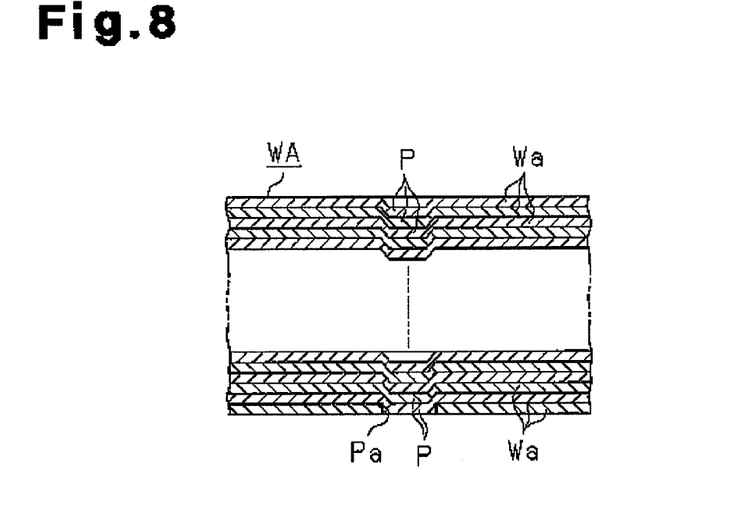
FIG. 8 is a cross-sectional view showing a portion of the core.

With reference to FIGS. 7 and 8, each of the core pieces Wa includes a plurality of positioning portions Pa, which project in one direction. Corresponding positioning portions Pa are engaged with one another to maintain the core WA in a laminated state.

By rotating and laminating punched core pieces to form a core in the above-described manner, variation in the thickness among the punched core pieces is canceled.

SUMMARY OF THE INVENTION

In rotary lamination of core pieces, a die is rotated by a predetermined angle and stopped at a predetermined position. However, a malfunction (a stop position malfunction) may occur at this stage and the die cannot be stopped at the predetermined position due to a certain cause. In this case, the rotary lamination of core pieces cannot be properly performed due to the malfunction.

To prevent this, some conventional rotary lamination apparatuses include a sensor for determining whether a stop position malfunction has occurred. In these cases, a pilot pin is arranged in an upper die, which moves together with a punch. The sensor detects whether the pilot pin has been received in a hole formed in a lower die. Specifically, if the pilot pin is inserted in the hole, it is determined that the die is free from a stop position malfunction, which permits punching of a core piece. In contrast, if the pilot pin is not received in the hole, it is determined that the die has a stop position malfunction. In this case, core piece punching is prohibited.

In this configuration, the occurrence of a stop position malfunction can be determined only after it is determined that the pilot pin, which descends together with the punch, has not been received in the hole. In other words, determination whether a stop position malfunction has happened in the die cannot be performed unless the punch starts to descend. Punching of a core piece is prohibited once it is determined that the stop position malfunction has occurred in the die. However, by this stage, the punch has already started to descend, which makes it necessary to halt operation of the punch in an extremely short time. As a result, there may be a case where the operation of the punch cannot be suspended appropriately.

As one method for solving this problem, a connection member may be arranged between the punch and a punch actuator to selectively connect and disconnect the punch and the actuator. The connecting member is operated to disconnect the actuator from the punch to stop operation of the punch immediately. This method, however, has the disadvantage described below. Typically, in the rotary lamination apparatus, the thin plate material W is subjected to machining in a number of steps. That is, the thin plate material W is fed to the apparatus and subjected to punch pressing steps at a plurality positions using a plurality of punches including the punch 108 illustrated in FIG. 6. The punches are actuated normally by a common actuator. As a result, if operation of the punch 108 is suspended by disconnecting the punch 108 from its actuator in the above-described manner, punches for other steps cannot be stopped. In the rotary lamination apparatus, the punch pressing step by the die 104 and the punch 108 cannot be carried out independently, which makes it necessary to repeat all punch pressing steps together.

Accordingly, it is an objective of the present invention to provide a rotary lamination apparatus that ensures early determination that a stop position malfunction has occurred in a die.

To achieve the foregoing objective, the present invention provides a rotary lamination apparatus having a die, a punch, a rotation drive source, a mounting table, at least one proximity sensor, and a determining device. The punch punches core pieces from a thin plate material. The rotation drive source drives and rotates the die about the central axis of the die. The mounting table is arranged in the inner space formed by the die. The core pieces are rotated and laminated on the mounting table. The proximity sensor detects whether the die is in the proximity of a predetermined position in a non-contact manner after the die has stopped rotating. The determining device determines whether the die is stopped at the predetermined position based on a detection result from the proximity sensor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of a rotary lamination apparatus according to the present invention will now be described with reference to FIGS. 1 to 5D.

Figure 1:
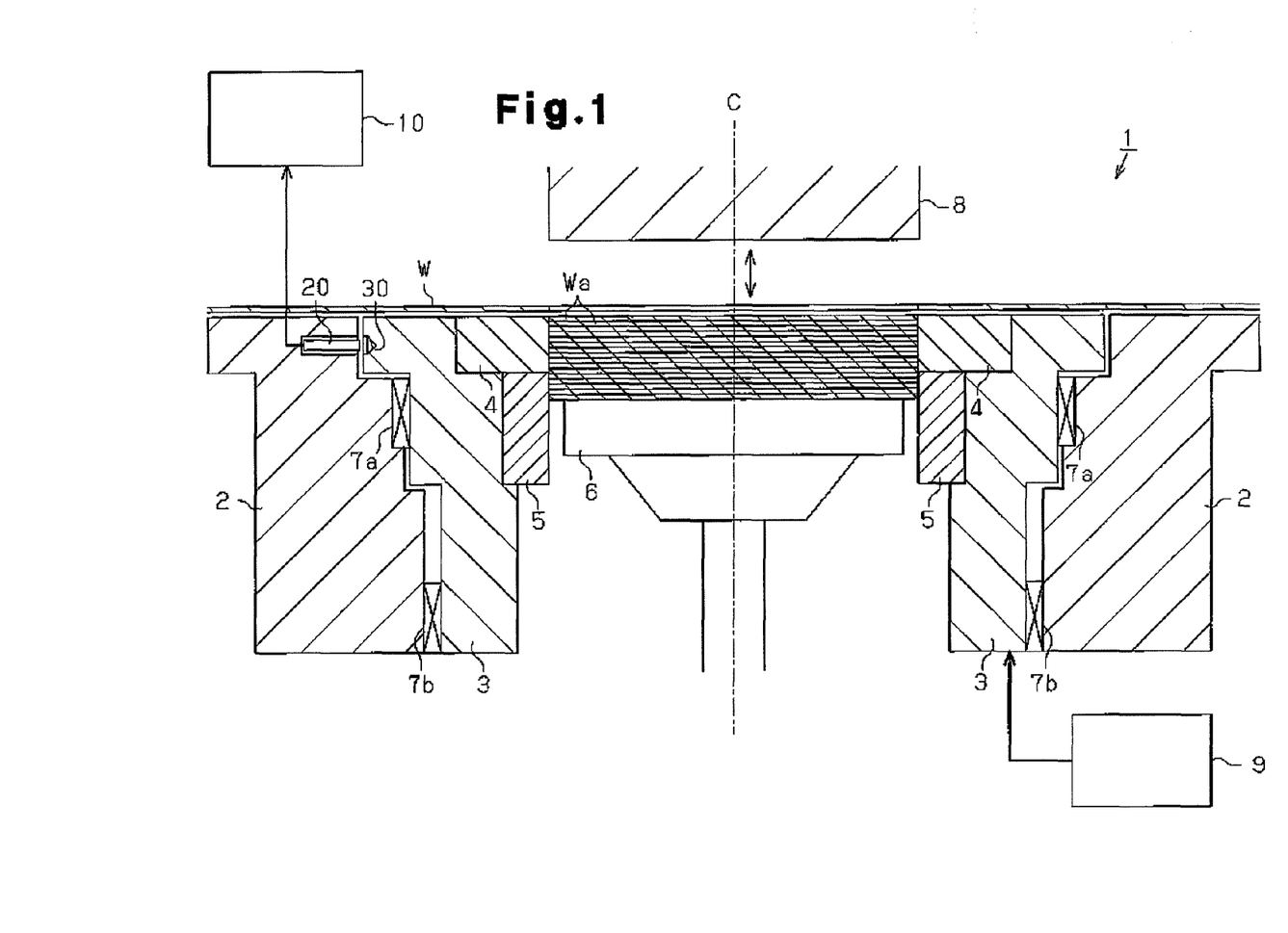
FIG. 1 is a longitudinal cross-sectional view showing a rotary lamination apparatus according to one embodiment of the present invention.

As shown in FIG. 1, a rotary lamination apparatus 1 has a substantially cylindrical holding member 3, which is rotationally supported at the inner circumference of a die set 2 through bearings 7a, 7b. An annular die 4 is fixed to the inner circumference of the holding member 3. A pressing ring 5 is fixed at a position below the die 4. The output shaft of a motor 9 is connected to the holding member 3 through a belt (not shown). The motor 9 functions as a rotation drive source. Drive force produced by the motor 9 causes the holding member 3, the die 4, and the pressing ring 5 to integrally rotate in one direction. A punch 8 is arranged above the die 4. The punch 8 selectively ascends and descends along the direction of the central axis C of the die 4.

A mounting table 6 is arranged in the inner space formed by the die 4 and the pressing ring 5. The mounting table 6 is movable in the direction of the central axis C of the die 4.

In the rotary lamination apparatus 1, as the punch 8 is lowered, the punch 8 and the die 4 cooperate to punch a thin plate material W, which is mounted on the die 4. A punched core piece Wa is pressed by the pressing ring 5 from the outer circumference of the core piece Wa and mounted on the mounting table 6. Prior to subsequent punching for a core piece Wa, the motor 9 rotates the die 4 by a predetermined angle (for example, 120 degrees). In this manner, core pieces Wa are rotated and laminated on the mounting table 6.

Figure 2A:
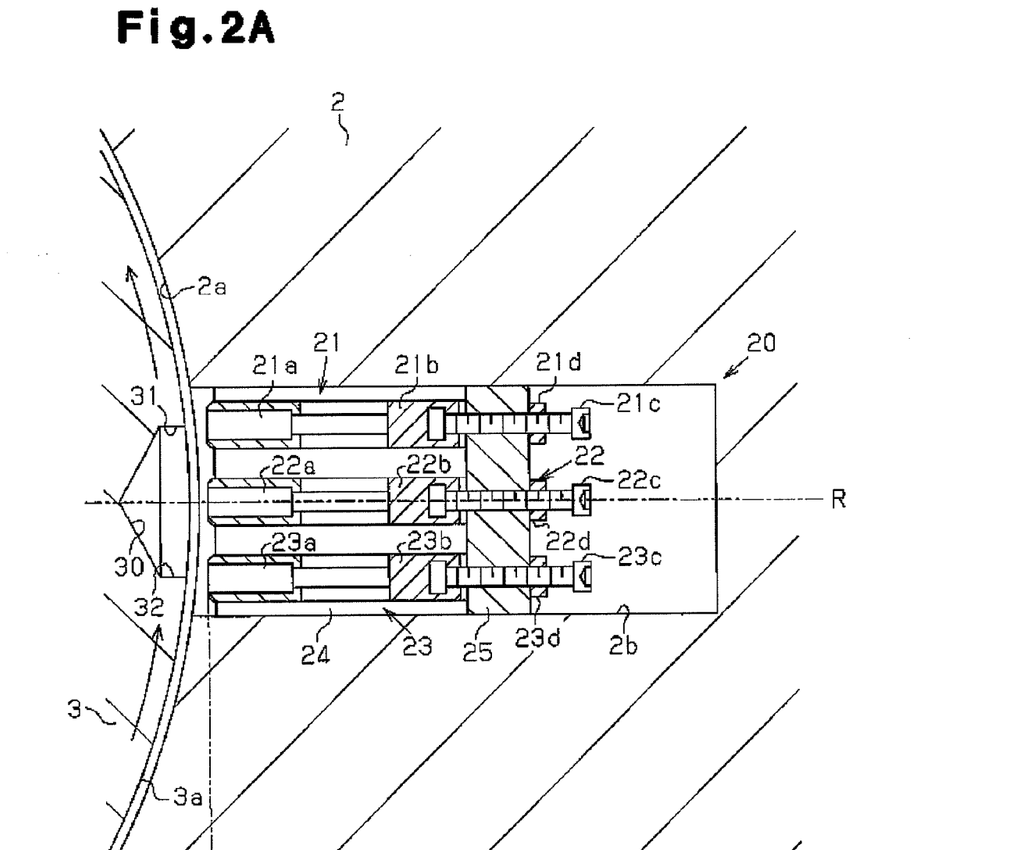
FIGS. 2A and 2B are cross-sectional views mainly showing proximity sensors in the rotary lamination apparatus of the illustrated embodiment.
Figure 2B:
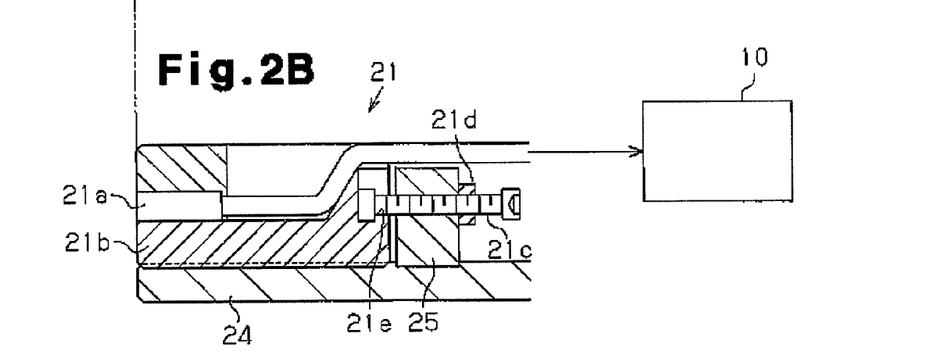

In the present embodiment, with reference to FIGS. 2A and 2B, a plurality of recesses 30 are formed in an outer peripheral surface 3a of the holding member 3 and arranged in the circumferential direction. The recesses 30 are spaced apart circumferentially at predetermined angles (for example, 120 degrees). The spacing angle is determined as a function of the predetermined angle by which the die 4 is rotated. The die set 2 includes a sensor unit 20, which detects the recesses 30 in a non-contact manner. The sensor unit 20 has three eddy current proximity sensors, which are first, second, and third proximity sensors 21, 22, and 23. The proximity sensors 21 to 23 are each arranged to face the outer peripheral surface 3a of the holding member 3.

The configuration of the sensor unit 20 will hereafter be described in detail.

As illustrated in FIGS. 2A and 2B, the first to third proximity sensors 21 to 23 are aligned on a plane perpendicular to the central axis C of the die 4. The second proximity sensor 22, which is located at the center among the three proximity sensors 21 to 23, faces a radial direction R of the die 4 and the holding member 3, as shown in FIGS. 1 and 2A. The first and third proximity sensors 21, 23 extend parallel to the second proximity sensor 22, as shown in FIG. 2A.

The first and third proximity sensors 21 and 23 are arranged such that, when the second proximity sensor 22 faces a central position of any one of the recesses 30 in the rotational direction of the holding member 3, the first and third proximity sensors 21 and 23 face a leading end 31 and a trailing end 32 of the recess 30, respectively. The leading end 31 is the upper end, and the trailing end 32 is the lower end, as viewed in FIG. 2A.

A recessed attachment portion 2b is formed in the die set 2. A base 24, to which the proximity sensors 21 to 23 are attached, is fixed to the attachment portion 2b. A support member 25 is fixed to the base 24. Sliding members 21b, 22b, and 23b, which correspond to the proximity sensors 21, 22, and 23, respectively, are arranged at the inner side (the left side as viewed in FIG. 2A) of the support member 25. The sliding members 21b, 22b, and 23b are slidable on the base 24. With reference to FIG. 2B, sensor bodies 21a, 22a, 23a are mounted on the upper surfaces of the corresponding sliding members 21b, 22b, 23b.

Since each of the proximity sensors 21 to 23 is attached in the same manner, the following description is focused on the proximity sensor 21 by way of example. An adjustment screw 21c is threaded into a through hole formed in the support member 25. The adjustment screw 21c has a distal portion with an enlarged diameter and is engaged with an engagement groove 21e formed in the sliding member 21b. In other words, the adjustment screw 21c is rotational relative to the sliding member 21b, and the position of the adjustment screw 21c relative to the sliding member 21b is prevented from changing in the longitudinal direction of the adjustment screw 21c. The adjustment screw 21c is adjusted to move relative to the through hole of the support member 25 in the longitudinal direction of the adjustment screw 21c. Such movement of the adjustment screw 21c causes the sliding member 21b to slide. This allows adjustment of the position of the sensor body 21a in a direction approaching or separating from the outer peripheral surface 3a of the holding member 3. A nut 21d is fastened to the adjustment screw 21c to prevent loosening of the adjustment screw 21c.

Signals output by the proximity sensors 21 to 23 are provided to an electronic control unit 10. The electronic control unit 10 functions as a determining device for determining whether the die 4 is stopped at a predetermined position.

Figure 3A:
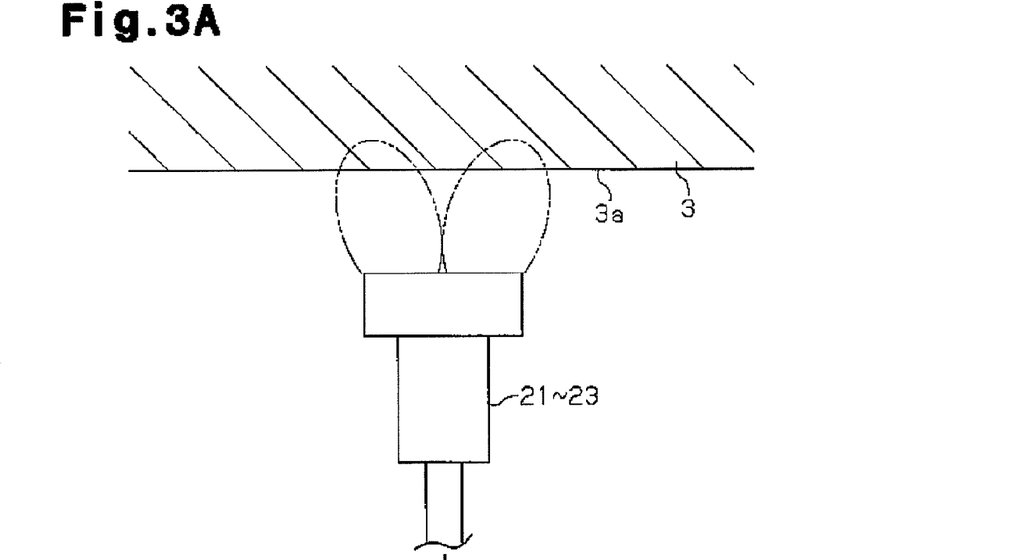
FIGS. 3A and 3B are diagrams each illustrating an output mode of one of the proximity sensors.

As illustrated in FIG. 3A, when the outer peripheral surface 3a of the holding member 3, which is a detection target, approaches the proximity sensors 21 to 23, a coil incorporated in each of the proximity sensors 21 to 23 produces a high frequency magnetic field. The zone covered by the magnetic field is a detectable range for the proximity sensor 21 to 23, as indicated by the double-dashed lines in FIGS. 3A and 3B. When the outer peripheral surface 3a of the holding member 3 is in the detectable range of any proximity sensor 21 to 23, electromagnetic induction causes an induced electric current (an eddy current) to flow in the outer peripheral surface 3a of the holding member 3. The electric current alters impedance of the corresponding coil. In response to such alteration, the proximity sensor 21 to 23 outputs an ON signal to the electronic control unit 10.

Figure 3B:
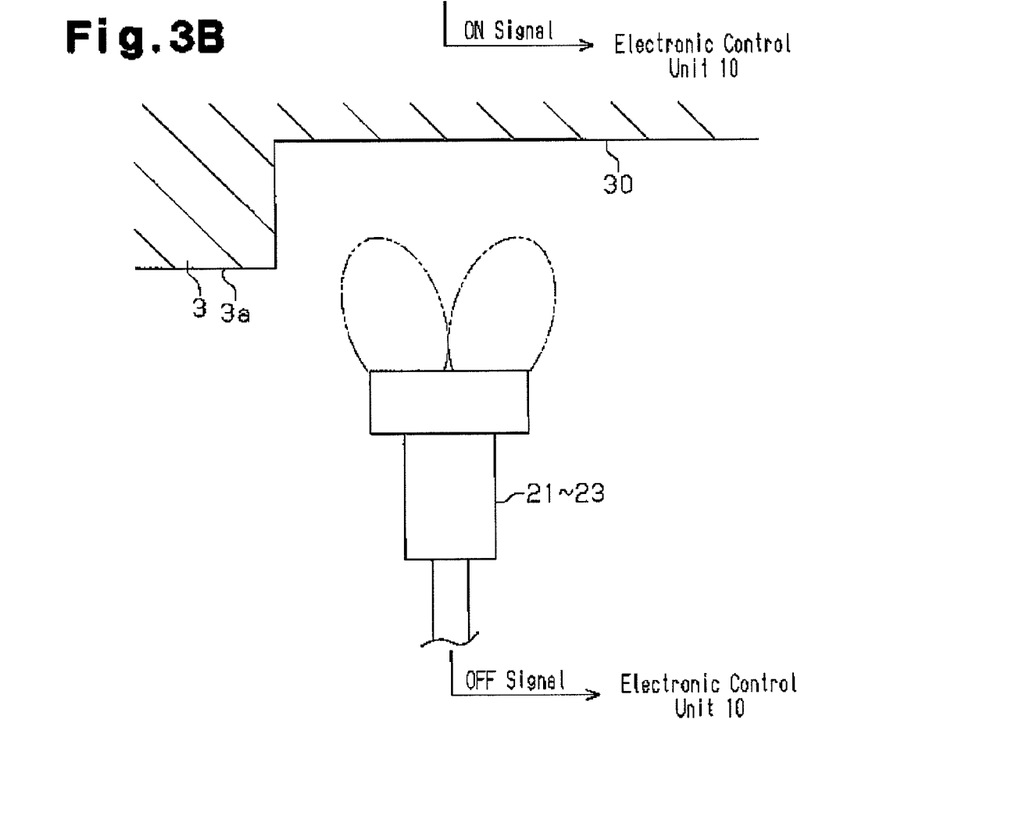

In contrast, when any recess 30 of the holding member 3 faces the detectable ranges of the proximity sensors 21 to 23, as illustrated in FIG. 3B, the outer peripheral surface 3a of the holding member 3 is outside the detectable ranges of the proximity sensors 21 to 23. In this case, only a small induced electric current flows in the outer peripheral surface 3a of the holding member 3. This causes little alteration in the impedance of each coil, and the proximity sensors 21 to 23 output OFF signals to the electronic control unit 10.

Figure 4A:
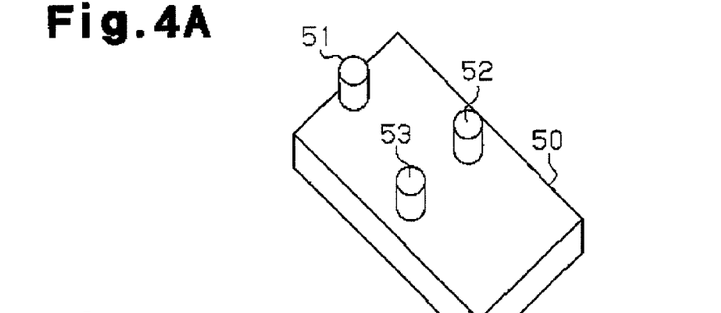
FIGS. 4A, 4B, and 4C are diagrams each illustrating a calibration method for a sensor unit.
Figure 4B:
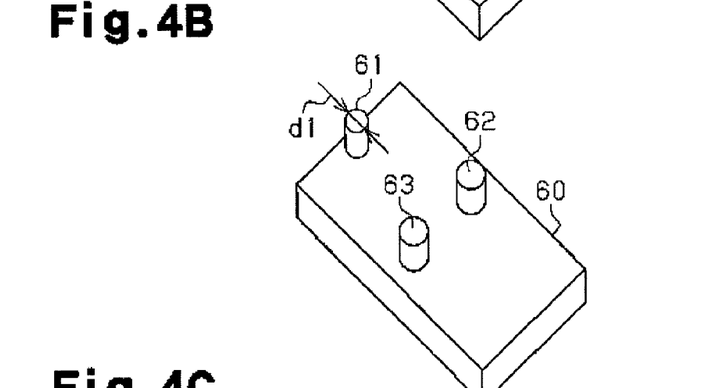
Figure 4C:
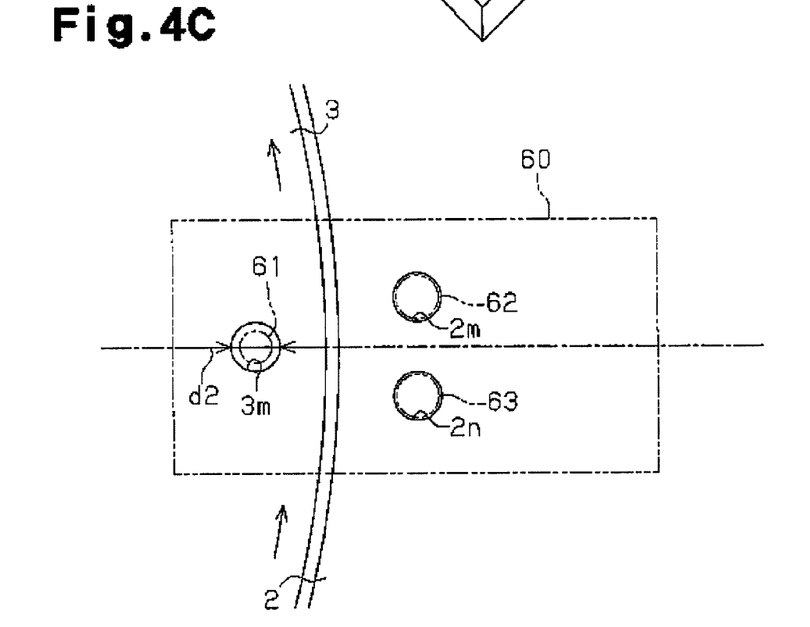

With reference to FIGS. 4A, 4B, and 4C, the configuration and method for adjusting the position of the sensor unit 20 will now be described. In the present embodiment, the holding member 3 is rotated by 120 degrees each time. However, the rotary lamination apparatus is configured to allow a slight change in a stop position of the holding member 3. Accordingly, the position of the sensor unit 20 is adjusted to permit such a change in the stop position of the holding member 3.

Specifically, as illustrated in FIG. 4C, a first adjustment hole 3m is formed in the holding member 3. The first adjustment hole 3m is spaced from the corresponding one of the recesses 30. Two second adjustment holes 2m, 2n are formed in the die set 2 and arranged in the circumferential direction of the holding member 3.

Adjustment of the position of the sensor unit 20 is started by operating a first jig 50, which is illustrated in FIG. 4A. The first jig 50 has a projection 51, a projection 52, and a projection 53, which are all shaped like pillars and engageable with the first adjustment hole 3m, the second adjustment hole 2m, and the second adjustment hole 2n, respectively. When each one of the projections 51, 52, 53 is engaged with the corresponding one of the first adjustment hole 3m and the second adjustment holes 2m, 2n, the die 4 is prohibited from rotating relative to the die set 2. Using the first jig 50, the die 4 and the die set 2 are fixed at a reference position. As illustrated in FIG. 2A, when the die 4 and the die set 2 are at the reference position, the central position of the corresponding recess 30 in the rotational direction of the holding member 3 faces the sensor body 22a of the second proximity sensor 22. With the die 4 set at the reference position by means of the first jig 50, the positions of the proximity sensors 21 to 23 are adjusted in the longitudinal directions of the proximity sensors 21 to 23 (see FIGS. 2A and 2B). The positions of the proximity sensors 21 to 23 are determined such that, when the die 4 is at the reference position, the second proximity sensor 22 outputs an ON signal and the first and third proximity sensors 21, 23 output OFF signals.

Subsequently, a second jig 60 illustrated in FIG. 4B is employed. The second jig 60 is shaped identically to the first jig 50 except for a projection 61 to be received in the first adjustment hole 3m in the holding member 3. The diameter d1 of the projection 61 is smaller than the diameter d2 of the first adjustment hole 3m of the holding member 3 (d1<d2). When the projection 61 and projections 62, 63 of the second jig 60 are each received in the corresponding one of the first adjustment hole 3m and the second adjustment holes 2m, 2n, the die 4 and the holding member 3 are rotational each by a predetermined angle relative to the die set 2 from the aforementioned reference position forward or rearward in the rotational direction. When the die 4 and the holding member 3 rotate, the projection 61 is movable by distance Δd (Δd=(d2−d1)/2) forward or rearward in the rotational direction.

With the second jig 60 installed and the die 4 rotated to the forward limit in the rotational direction relative to the die set 2, the position of the third proximity sensor 23 in the longitudinal direction is adjusted such that the third proximity sensor 23 outputs an ON signal.

With the holding member 3 rotated to the rearward limit in the rotational direction relative to the die set 2, the position of the first proximity sensor 21 in the longitudinal direction is adjusted such that the first proximity sensor 21 outputs an ON signal.

Accordingly, an acceptable range for change in the stop position of the die 4 is determined by the forward and rearward limits. If the angular difference between the stop position and the reference position of the die 4 is smaller than the angular difference between each limit and the reference position, a change in the stop position of the die 4 is in the acceptable range.

Operation of the present embodiment will hereafter be described based on the relationship between the stop position of the holding member 3 (the die 4) and signals output from the proximity sensors 21 to 23.

In the rotary lamination apparatus 1 of the present embodiment, the punch 8 and the die 4 cooperate to punch the thin plate material W mounted on the die 4. Then, prior to subsequent punching for another core piece Wa, the motor 9 rotates the die 4 by the predetermined angle (for example, 120 degrees) and stops the die 4 at the predetermined position.

Figure 5A:
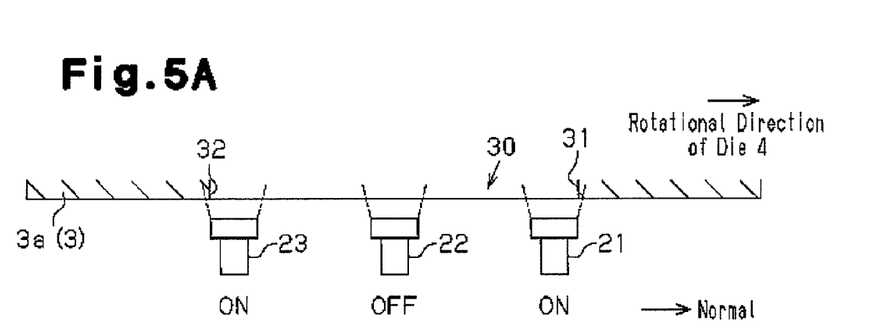
FIGS. 5A, 5B, 5C, and 5D are diagrams each illustrating the relationship between a stop position of a holding member and signals provided by the proximity sensors.

FIG. 5A illustrates a state in which the die 4 is stopped at the predetermined position, which includes the reference position. In this case, the leading end 31 and the trailing end 32 of the corresponding recess 30 of the holding member 3 are both in the detectable ranges of the first proximity sensor 21 and the third proximity sensor 23. In contrast, the outer peripheral surface 3a of the holding member 3 is outside the detectable range of the second proximity sensor 22. As a result, the first proximity sensor 21 and the third proximity sensor 23 each output an ON signal and the second proximity sensor 22 outputs an OFF signal.

Figure 5B:
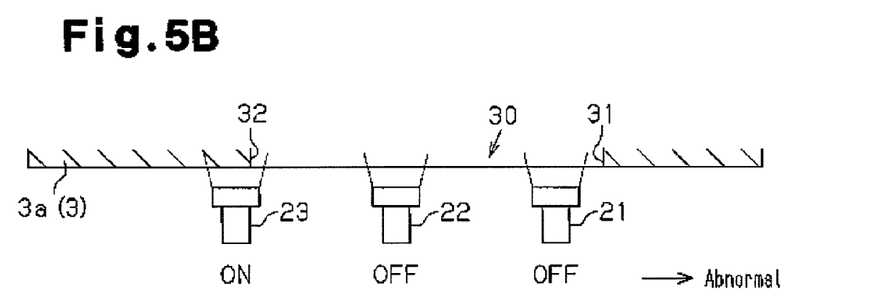

FIG. 5B shows a state in which the die 4 is stopped after overshooting the predetermined position in the rotational direction. In this case, the outer peripheral surface 3a of the holding member 3 is outside the detectable ranges of the first proximity sensor 21 and the second proximity sensors 22. In contrast, the trailing end 32 of the corresponding recess 30 of the holding member 3 is in the detectable range of the third proximity sensor 23. As a result, the first proximity sensor 21 and the second proximity sensor 22 each output an OFF signal and the third proximity sensor 23 outputs an ON signal.

Figure 5C:
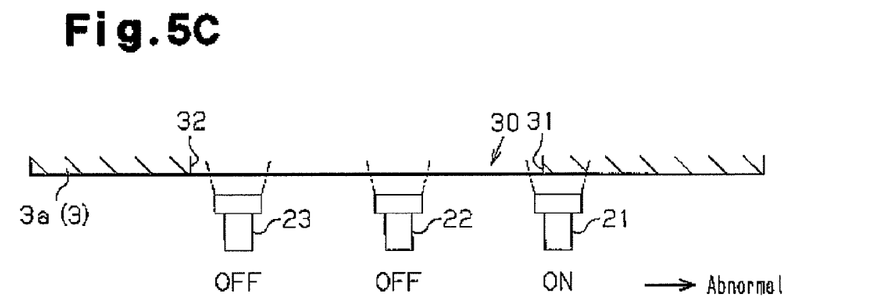

In FIG. 5C, the die 4 is stopped before reaching the predetermined position in the rotational direction. In this case, the leading end 31 of the corresponding recess 30 of the holding member 3 is in the detectable range of the first proximity sensor 21. In contrast, the outer peripheral surface 3a of the holding member 3 is outside the detectable ranges of the second proximity sensor 22 and the third proximity sensor 23. As a result, the first proximity sensor 21 outputs an ON signal and the second proximity sensor 22 and the third proximity sensor 23 both output an OFF signal.

Figure 5D:
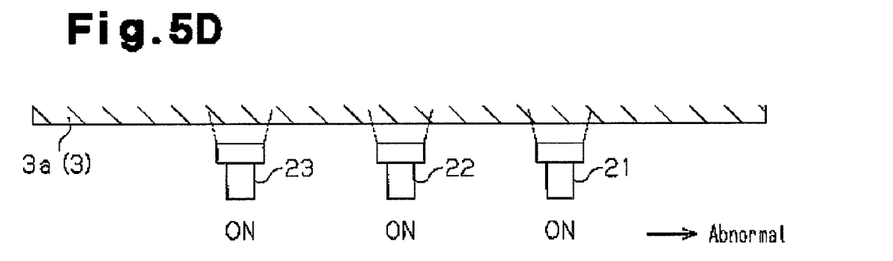

FIG. 5D shows a state in which the die 4 is stopped at a position completely displaced from the predetermined position. In this case, the outer peripheral surface 3a of the holding member 3 is in the detectable ranges of the first to third proximity sensors 21 to 23. As a result, the proximity sensors 21 to 23 each output an ON signal.

The electronic control unit 10 determines the state of the stop position of the die 4 based on a signal combination provided by the proximity sensors 21 to 23 immediately after the die 4 stops rotating. If the electronic control unit 10 determines that a stop position malfunction has occurred in the die 4, operation of the punch 8 is suspended immediately, before the punch 8 starts to descend.

The rotary lamination apparatus of the present embodiment has the advantages described below.

(1) The rotary lamination apparatus 1 has the sensor unit 20 (the proximity sensors 21 to 23) and the electronic control unit 10. The sensor unit 20 detects whether a specific portion of the die 4 is located in the proximity of the sensor unit 20 in a non-contact manner. After the die 4 stops rotating, the electronic control unit 10 determines whether the die 4 is stopped at a predetermined position based on a detection result provided by the sensor unit 20. This configuration allows determination whether the die 4 is stopped at the predetermined position using the detection result of the sensor unit 20 immediately after the die 4 stops rotating. As a result, a stop position malfunction in the die 4 is determined at an early stage, thus allowing immediate suspension of operation of the punch 8 before the punch 8 starts to descend. Also, if the rotary lamination apparatus 1 has a plurality of punches for multiple punch pressing steps that are actuated by a common actuator, repetition of all of the punch pressing steps together, which is disadvantageous, is avoided.

(2) The holding member 3, which is tubular and rotates integrally with the die 4, is arranged on the outer circumference of the die 4. The die set 2, which rotationally supports the holding member 3, is located on the outer circumference of the holding member 3. The recesses 30, each of which corresponds to a predetermined position of the die 4, are formed in the outer peripheral surface 3a of the holding member 3. The sensors 21 to 23 are arranged at the positions in the die set 2 facing the outer peripheral surface 3a of the holding member 3. The sensors 21 to 23 are configured to detect the recesses 30. In this configuration, the recesses 30 do not necessitate a particular change in the clearance between an inner peripheral surface 2a of the die set 2 and the facing outer peripheral surface 3a of the holding member 3 in a conventional configuration. As a result, the rotary lamination apparatus 1 is provided without greatly modifying the configuration of an existing rotary lamination apparatus.

(3) The three proximity sensors 21 to 23 are arranged along the rotational direction of the holding member 3. When the first proximity sensor 21 and the third proximity sensor 23 each output an ON signal and the second proximity sensor 22 outputs an OFF signal, the electronic control unit 10 determines that the die 4 is stopped at the predetermined position. In this configuration, even if the detectable range of each single proximity sensor is narrow, it is accurately determined whether the corresponding recess 30 of the holding member 3 is located close to the proximity sensors 21 to 23 based on the signals provided by the three proximity sensors 21 to 23. In other words, determination whether the die 4 is stopped at the predetermined position is carried out with improved accuracy.

(4) When the first proximity sensor 21 (the third proximity sensor 23) outputs an ON signal and the third proximity sensor 23 (the first proximity sensor 21) outputs an OFF signal, the electronic control unit 10 determines that the die 4 is stopped at a position displaced from the predetermined position toward the third proximity sensor 23 (the first proximity sensor 21) in the rotational direction.

Even when a single proximity sensor is employed, it can be accurately determined whether the die is stopped at the predetermined position based on a detection result obtained by the sensor, as long as the sensor has a sufficiently broad detectable range. However, in this case, if the die is not stopped at the predetermined position, it cannot be determined toward which side in the rotational direction the stop position of the die is displaced from the predetermined position.

In this regard, in the above embodiment, when the die 4 is stopped after slightly overshooting the predetermined position, the third proximity sensor 23 corresponding to the trailing end 32 of the corresponding recess 30 in the rotational direction generates an ON signal and the first proximity sensor 21 corresponding to the leading end 31 of the recess 30 in the rotational direction outputs an OFF signal. In contrast, if the die 4 is stopped before reaching the predetermined position, the third proximity sensor 23 corresponding to the trailing end 32 of the recess 30 in the rotational direction outputs an OFF signal and the first proximity sensor 21 corresponding to the leading end 31 of the recess 30 in the rotational direction outputs an ON signal. This allows precise determination of the state in which the die 4 is stopped.

(5) The attachment positions of the proximity sensors 21 to 23 are adjustable in a direction approaching or separating from the outer peripheral surface 3a of the holding member 3. In this configuration, even if the detectable ranges of the proximity sensors 21 to 23 vary from one range to another or change as the time elapses, the attachment positions of the sensors 21 to 23 can be adjusted to maintain high accuracy in detection of the outer peripheral surface 3a.

(6) Eddy current sensors are employed as the proximity sensors 21 to 23. It is possible to use a photoelectric sensor, for example, as a sensor for detecting the position of the die 4. However, in the rotary lamination apparatus 1, the characteristics of light such as reflection rate or refraction index are easily altered by lubricant. As a result, it may be difficult for a photoelectric sensor to accurately detect whether the die 4 is stopped at the predetermined position. In contrast, the above-described configuration in which the eddy current sensors are employed as the proximity sensors prevents detection accuracy from being decreased by the lubricant.

The rotary lamination apparatus according to the present invention is not restricted to the configuration described in the above embodiment. The embodiment may be modified as necessary to, for example, the forms described below.

In the above embodiment, each of the proximity sensors 21 to 23 outputs an ON signal when the outer peripheral surface 3a of the holding member 3 is in the detectable range of the proximity sensor 21, 22, 23. Each proximity sensor 21, 22, 23 outputs an OFF signal when the corresponding recess 30 of the holding member 3 is in the detectable range of the proximity sensor 21, 22, 23 and the outer peripheral surface 3a of the holding member 3 is outside the detectable range. Alternatively, each proximity sensor may generate an OFF signal if the outer peripheral surface 3a of the holding member 3 is in the detectable range of the proximity sensor and output an ON signal when the outer peripheral surface 3a of the holding member 3 is not in the detectable range.

The eddy current proximity sensors may be replaced by magnetic or electrostatic capacitance proximity sensors.

If each proximity sensor has a sufficiently wide detectable range, a single proximity sensor or two proximity sensors may be employed to detect the proximity state of the corresponding recess 30 of the holding member 3.

Neither the sensor unit 20 nor the recesses 30 are restricted to the positions illustrated in FIG. 1. The sensor unit 20 and the recesses 30 may be arranged, for example, immediately above the bearing 7b.

In the above embodiment, the sensor unit 20 detects the proximity state of each recess 30 formed in the outer peripheral surface 3a of the holding member 3. Instead, a projection may be projected from the outer peripheral surface of the holding member and the proximity state of the projection may be detected.

In the above embodiment and its modifications, the proximity sensors detect the proximity state of each recess or projection formed in the holding member to detect the proximity state of the die at the reference position indirectly. However, the present invention is not restricted to this. As long as the proximity state of the die at the reference position is detected in a non-contact manner, the die at the reference position may be detected directly by the proximity sensors.

Therefore, the present examples and embodiments are to be considered as illustrative and not restrictive and the invention is not to be limited to the details given herein, but may be modified within the scope and equivalence of the appended claims.

The invention claimed is:
1. A rotary lamination apparatus for rotating and laminating core pieces, the apparatus comprising:
a die;
a punch that descends into an inner space of the die to punch core pieces from a thin plate material mounted on the die;

a rotation drive source that intermittently drives and rotates the die about the central axis of the die;

a mounting table arranged in the inner space of the die, wherein the core pieces are rotated and laminated on the mounting table;

at least one proximity sensor, wherein, when the die has stopped rotating, the proximity sensor detects whether the die is in the proximity of a predetermined position for the die in a non-contact manner;

a determining device that determines whether the die is stopped at the predetermined position based on a detection result from the proximity sensor; and a tubular holding member that rotates integrally with the die is arranged on the outer circumference of the die, a die set for rotationally supporting the holding member is located on the outer circumference of the holding member, a recess corresponding to the predetermined position of the die is formed in an outer peripheral surface of the holding member, and the proximity sensor is arranged at a position in the die set facing the outer peripheral surface of the holding member and is configured to detect the recess.

2. The rotary lamination apparatus according to claim 1, wherein the at least one proximity sensor is one of a first proximity sensor, a second proximity sensor, and a third proximity sensor that are arranged along a rotational direction of the holding member, the second proximity sensor is arranged between the first proximity sensor and the third proximity sensor, and the determining device is configured such that, when the first proximity sensor and the third proximity sensor detect the outer peripheral surface of the holding member and the second proximity sensor detects the recess, the determining device determines that the die is stopped at the predetermined position.

3. The rotary lamination apparatus according to claim 2, wherein the determining device is configured such that, when one of the first proximity sensor and the third proximity sensor outputs a predetermined signal and the other one of the first proximity sensor and the third proximity sensor does not, the determining device determines that the die is stopped at a position displaced from the predetermined position in the rotational direction toward the one of the first proximity sensor and the third proximity sensor that outputs the predetermined signal.

4. The rotary lamination apparatus according to claim 2, wherein an attachment position of each of the proximity sensors is adjustable in a direction approaching or separating from the outer peripheral surface of the holding member.

5. The rotary lamination apparatus according to claim 1, wherein a first adjustment hole is formed in the holding member, and a second adjustment hole is formed in the die set, and the first adjustment hole and the second adjustment hole are configured to become engaged with a jig for temporarily joining the holding member and the die set to each other when the die is arranged at the predetermined position.

* * * * *